(12) United States Patent
Song et al.

(10) Patent No.: US 8,850,881 B2
(45) Date of Patent: Oct. 7, 2014

(54) METHOD FOR MEASURING REACTOR BED LEVEL FROM ACTIVE ACOUSTIC MEASUREMENT AND ANALYSIS

(75) Inventors: Limin Song, West Windsor, NJ (US); Julio D. Lobo, Baden (CH); Jormarie Bitar, Fairfax, VA (US); Mark M. Disko, Glen Gardner, NJ (US)

(73) Assignee: ExxonMobil Research & Engineering Company, Annandale, NJ (US)

(*) Notice: Subject to any disclaimer, the term of this patent is extended or adjusted under 35 U.S.C. 154(b) by 207 days.

(21) Appl. No.: 12/387,886

(22) Filed: May 8, 2009

(65) Prior Publication Data

US 2009/0282910 A1 Nov. 19, 2009

Related U.S. Application Data

(60) Provisional application No. 61/127,401, filed on May 13, 2008.

(51) Int. Cl.
*G01F 23/296* (2006.01)

(52) U.S. Cl.
CPC ............... *G01F 23/296* (2013.01); *G01F 23/2966* (2013.01)
USPC ........................................ 73/290 V

(58) Field of Classification Search
USPC ........................................ 73/290 V
See application file for complete search history.

(56) References Cited

U.S. PATENT DOCUMENTS

| | | | | |
|---|---|---|---|---|
| 2,990,543 | A * | 6/1961 | Rod | 340/621 |
| 4,320,659 | A * | 3/1982 | Lynnworth et al. | 73/589 |
| 4,480,468 | A * | 11/1984 | Sinha | 73/290 V |
| 4,770,038 | A * | 9/1988 | Zuckerwar et al. | 73/290 V |
| H0608 | H * | 3/1989 | Goolsby | 367/89 |
| 5,022,266 | A * | 6/1991 | Cody et al. | 73/579 |
| 5,035,140 | A * | 7/1991 | Daniels et al. | 73/290 V |
| 5,038,611 | A * | 8/1991 | Weldon et al. | 73/290 V |
| 5,264,831 | A * | 11/1993 | Pfeiffer | 340/621 |
| 5,943,294 | A * | 8/1999 | Cherek et al. | 367/98 |
| 6,053,041 | A * | 4/2000 | Sinha | 73/290 V |
| 6,053,042 | A * | 4/2000 | Hwang et al. | 73/290 V |
| 6,443,004 | B1 * | 9/2002 | Heuft et al. | 73/290 V |
| 6,553,830 | B2 * | 4/2003 | Fahrenbach et al. | 73/290 V |
| 2005/0149277 | A1 * | 7/2005 | Bailey et al. | 702/54 |
| 2006/0031030 | A1 * | 2/2006 | Bennett et al. | 702/50 |
| 2006/0042386 | A1 * | 3/2006 | Young et al. | 73/579 |
| 2007/0038393 | A1 * | 2/2007 | Borah et al. | 702/56 |
| 2007/0267176 | A1 | 11/2007 | Song et al. | |

* cited by examiner

*Primary Examiner* — Hezron E Williams
*Assistant Examiner* — Mark A Shabman
(74) *Attorney, Agent, or Firm* — Ronald D. Hantman; Bruce M. Bordelon; Glenn T. Barrett

(57) ABSTRACT

The present invention is a non-intrusive method to determine the fluid level in a vessel. In a preferred embodiment, the vessel is a delayed coker drum in a refinery. Waves are generated in the vessel from an outside source. For wall vibration generated in the frequency range of 1-20,000 Hz, accelerometers on the exterior wall of the vessel measures the frequency of the vibration modes of the vessel. The fluid level can be related to the frequency of the vibration mode.

16 Claims, 8 Drawing Sheets schematics diagram of vessel level measurement system

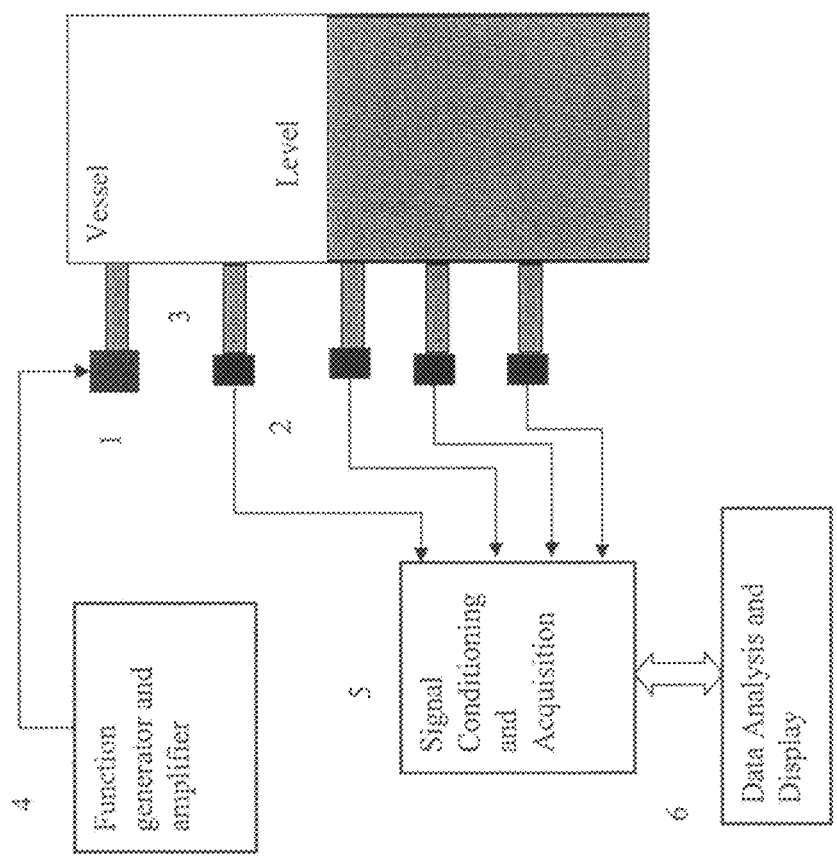
Figure 1: schematics diagram of vessel level measurement system

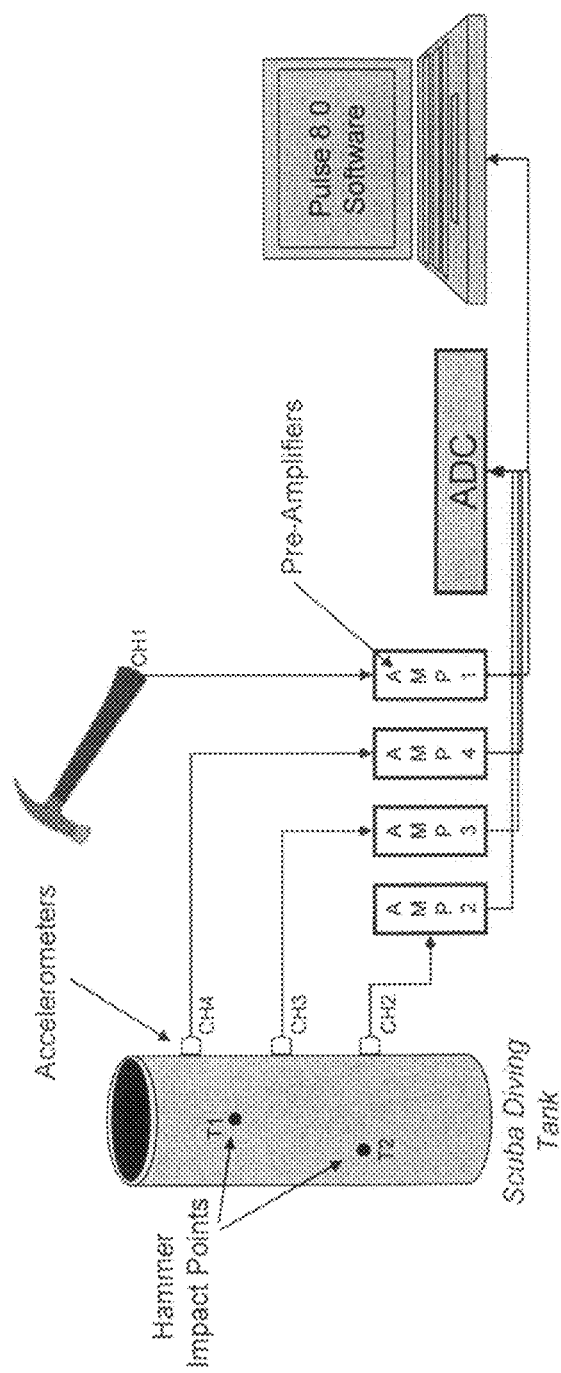
Figure 2: Schematic diagram of the experimental setup for Example 1

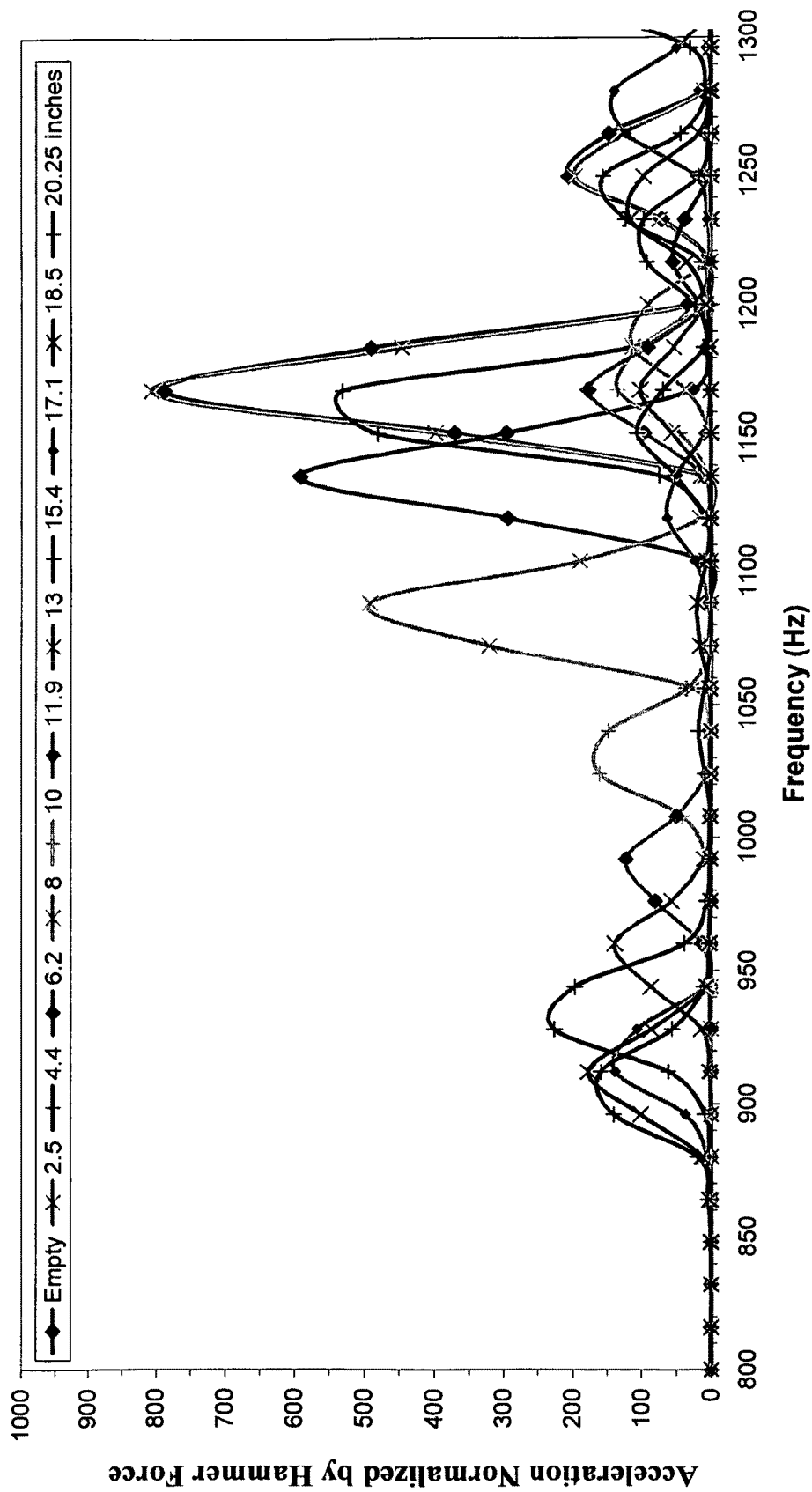
Figure 3: Frequency spectrums of normalized vibration at various water fill levels from Experiment 1 of Example 1, measured with accelerometer at CH2 and hammered at point of impact T1.

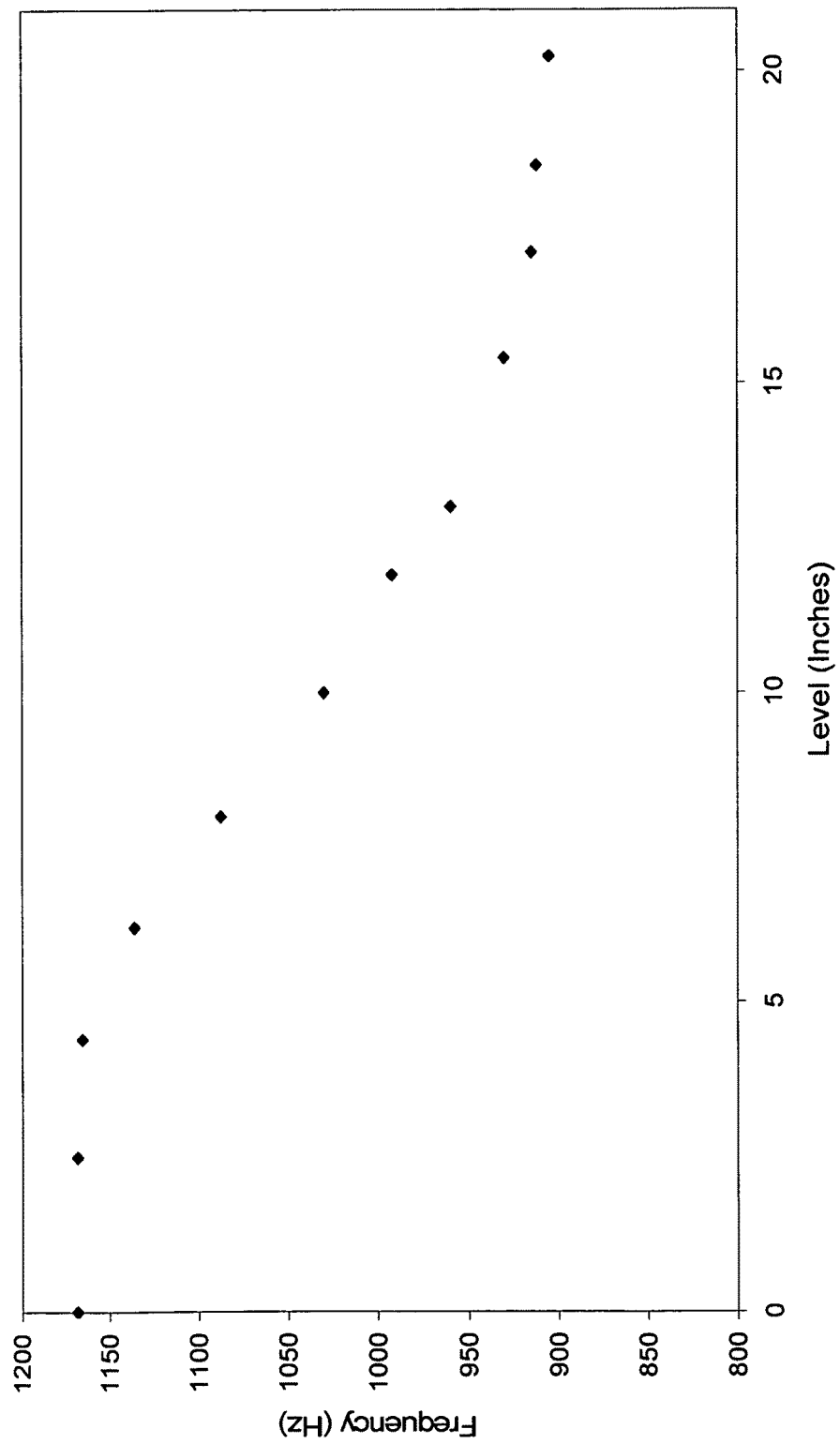
Figure 4: Plot of modal frequency verses water fill level from Experiment 1 of Example 1, measured with accelerometer at CH2 and hammered at point of impact T1.

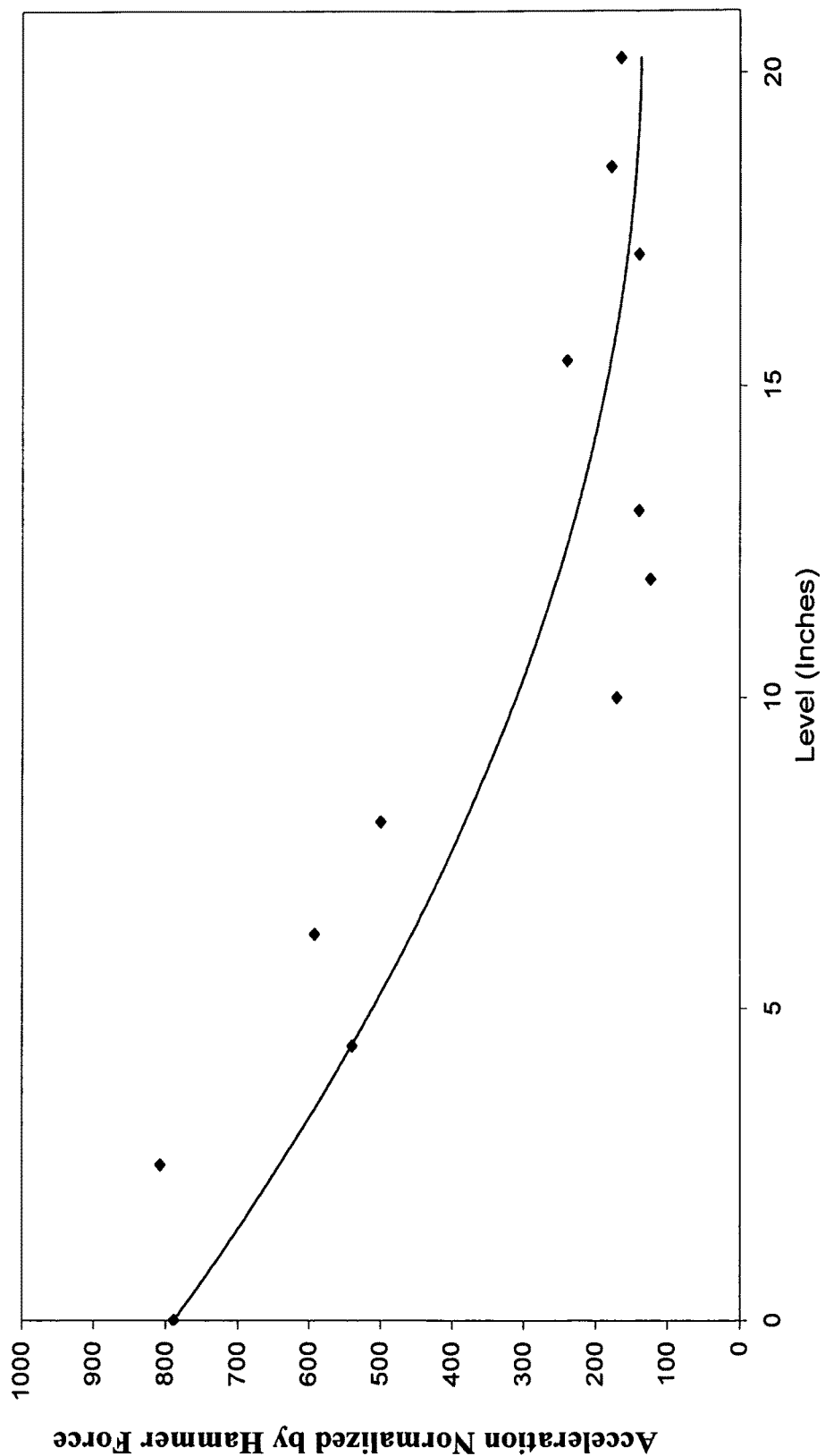
Figure 5: Plot of modal vibration amplitude, normalized by hammer force, verses water fill level from Experiment 1 of Example 1, measured with accelerometer at CH2 and hammered at T1.

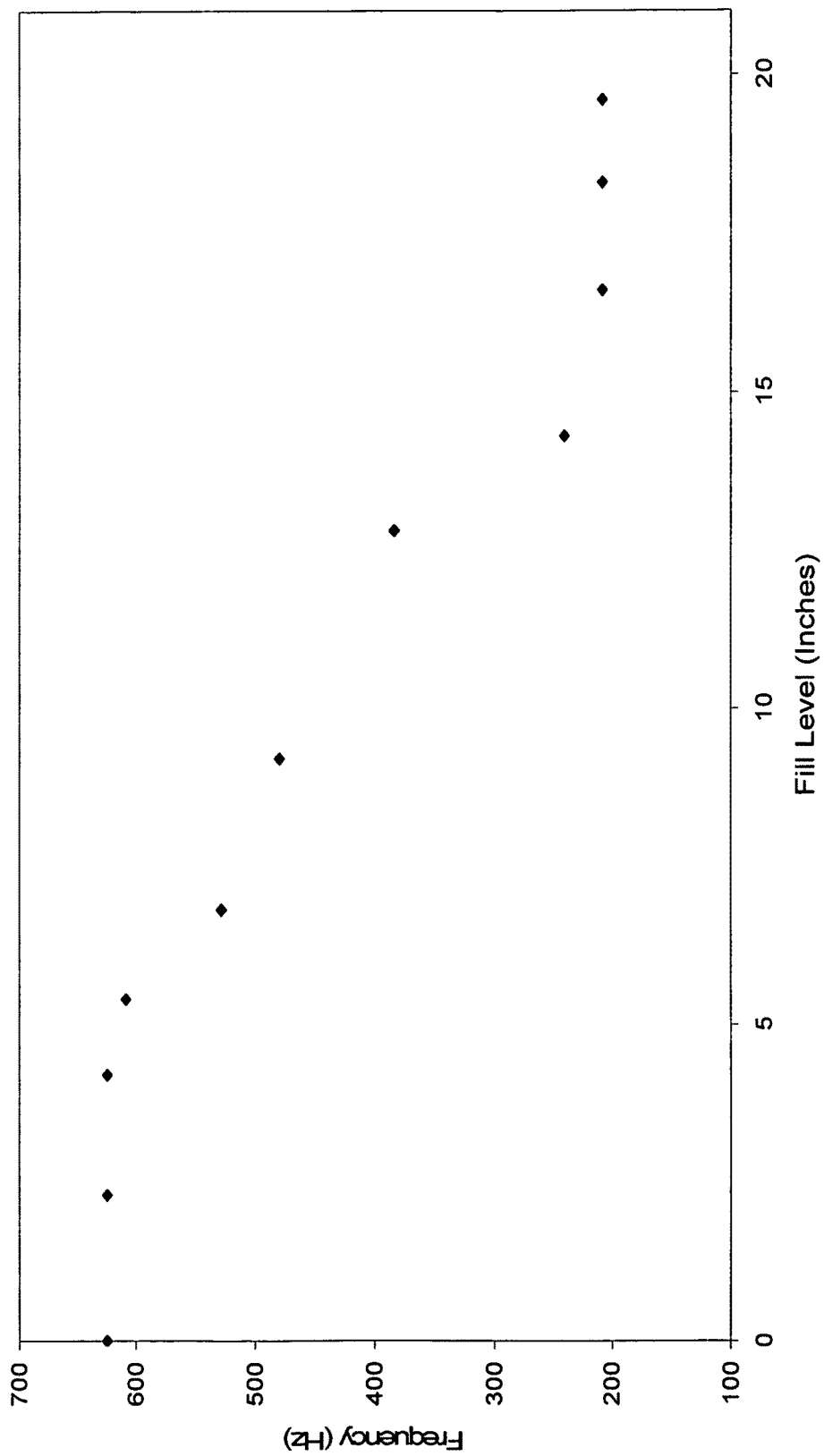
Figure 6: Plot of modal frequency verses the fill level of mixture of coke/water from Experiment 2 of Example 1, measured at CH2 and hammered at T1.

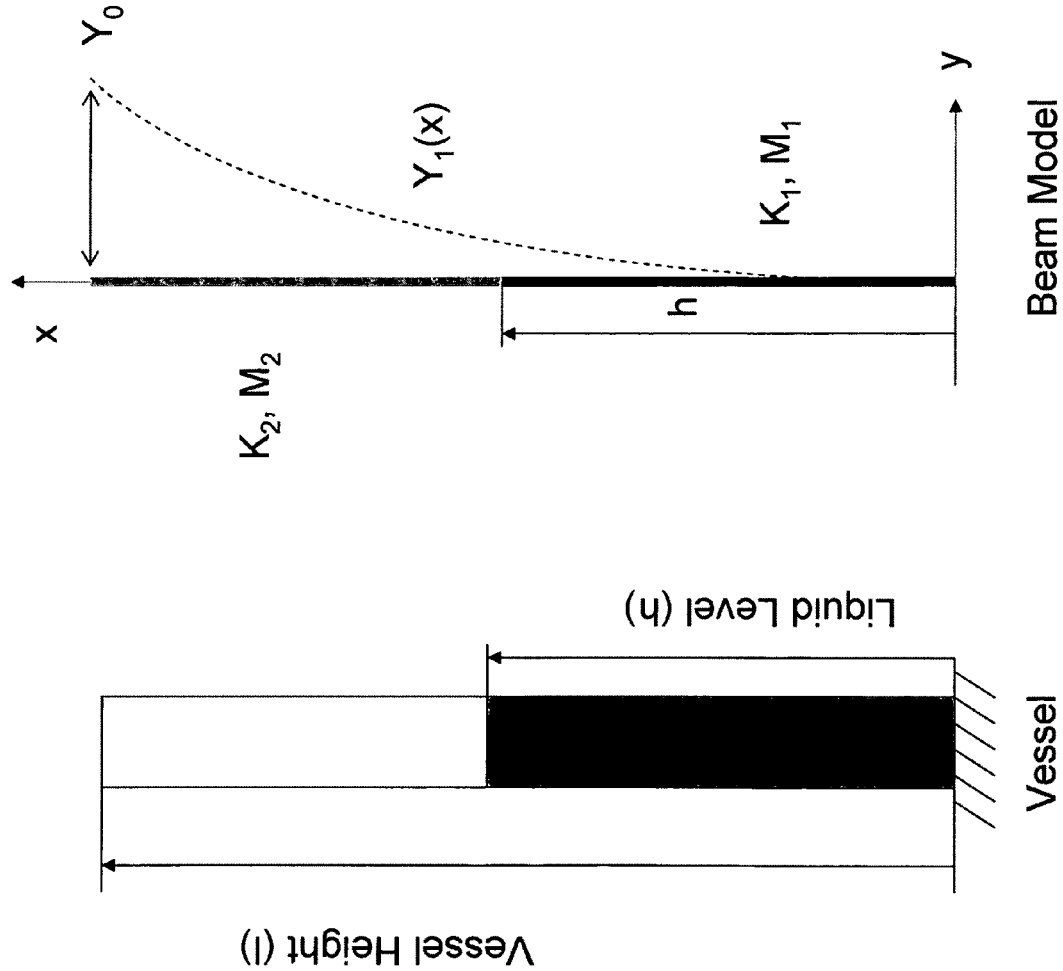
Figure 7: Schematic diagram of the beam model of vessel vibration

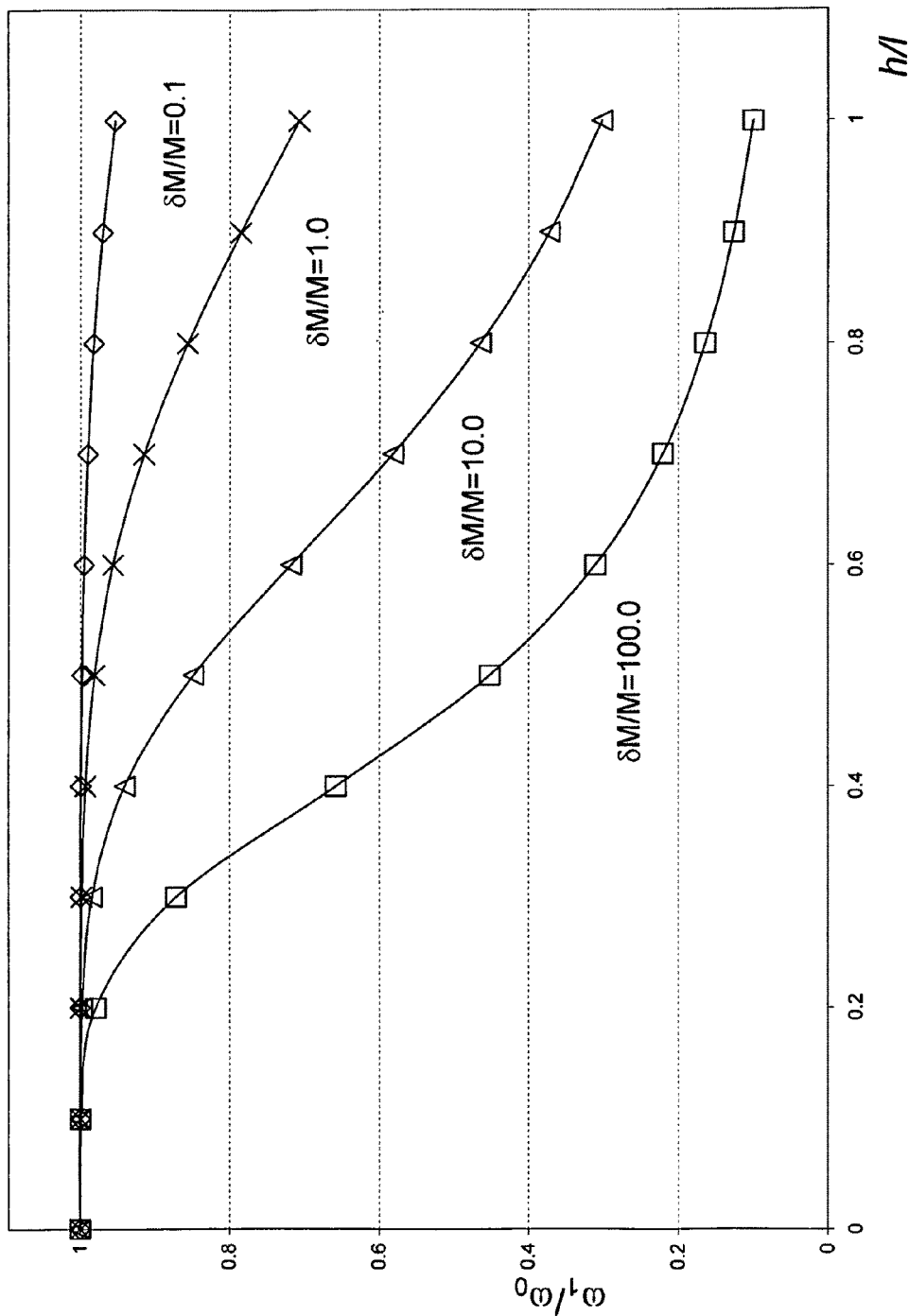
Figure 8: Natural frequency of the first vibration mode as a function of the liquid level and mass, calculated from an inhomogeneous cantilever model. Given a value of $\delta M_{liquid}/M$, the frequency decreases with the level, h. Given a value of h/l, the frequency drop is larger with heavier liquid or large value of $\delta M_{liquid}/M$

METHOD FOR MEASURING REACTOR BED LEVEL FROM ACTIVE ACOUSTIC MEASUREMENT AND ANALYSIS

This Application claims the benefit of U.S. Provisional Application 61/127,401 filed May 13, 2008.

BACKGROUND OF THE INVENTION

The present invention is a method to determine bed levels in a reactor. In particular, the present invention uses a non-intrusive method to monitor the bed level in the reactor in a refinery. More particularly, the method is used to monitor the fluid lever in a delayed coker drum.

It is important to know the bed level in a process reactor, particularly a delayed coker, in a refinery. Delayed-coking is an important process which is used to convert vacuum resides to lighter distillates and produce coke as byproduct. Delayed-cokers are operated in semi-batch mode, with at least two coke drums. While one is being filled or coked, the other is being de-coked. During the coking cycle, the drum is gradually filled with liquid feed at elevated temperature (typically around 900 degree F.) from a bottom nozzle, vapor product leaves the drum at the top, and coke forms inside the drum as the result of a complex solidification process. During the decoking cycle, the drum is first cooled by steam or water. After cooling and draining, a high-pressure rotary water jet is used to cut coke loose, which is removed from the bottom of drum for transportation. Delayed coker is recognized as one of primary capacity bottlenecks at many refineries.

Refineries that have difficulty in knowing the exact level in the drum run two risks. One is that they overfill the drum. In this case the coke inside the drum starts to stick to the top outlet and to any structure on the top of the drum. When this occurs the drum needs to be shut down and manually cleaned. This leads to significant throughput loss and maintenance cost. The second risk is that in order to prevent the condition described above a large portion of the drum is left unfilled and unused. This unused volume represents a loss of throughput for the unit. For example, a five feet excess outage in a 100 feet tall drum represents a 5% throughput loss.

Due to the significant financial impact of this problem a few different methods used to predict or measure the level have been developed. The least expensive one is to calculate the level from the feed conditions. This suffers from the difficulty in knowing the final density of the coke and is not reliable. Methods using ranging radar or sonar have to be installed inside the reactor and suffer severe fouling problems. Other methods using radioactive sources have also been developed to measure the bed level. These are more expensive, have radioactive hazards, and generally suffer from reliability issues (probably due to workers avoiding maintenance contact with radioactive devices). Other drawbacks of the radioactive devices are that they can only provide discrete level measurements, instead of continuous measurements provided by the current invention.

The dynamic response of a vessel filled with a liquid/solid to the excitation of a sound source varies with the level and properties of material in the vessel. These variations in the dynamic response result from the changes in the natural frequencies, mode shapes and attenuations when the fill level varies. In the present invention, these differences are recognized and successfully correlated to different fill levels in a vessel. By measuring the dynamic response of the vessel to a known excitation source, the fill level could be estimated. The main advantage of this approach is that it is non-intrusive, low cost and simple to install and use.

SUMMARY OF THE INVENTION

The present invention is a non-intrusive method to determine the material in a vessel such as a process reactor, or a liquid storage tank. In a preferred embodiment, the vessel is a delayed coker drum in a refinery. The method uses an acoustic/vibration source to generate vibration or elastics waves traveling along the vessel wall. The characteristics of the wall vibration depend on the fill level of the vessel. One or more acoustic/vibration receivers are strategically placed on the exterior surface of the wall, preferably along the vertical axis of the vessel to measure the vibration response of the wall to the source. The measured vibration signals are analyzed to determine the amount of the change in the characteristics of the wall vibration due to the fill level. A correlation model describing the change in characteristics of the wall vibration is used to estimate the fill level. This process will be repeated to provide continuous or periodic estimate of the fill level.

The change in the characteristics of the wall vibration due to the change in the fill level could be the variation in natural vibration modes (shapes and frequencies) or attenuation or both. For excitation source in audible frequency range (1-20,000 Hz), we found that the shift in natural frequency (or called as modal frequency) of the wall vibration is pronounced and is better correlated to the fill level. The method may be implemented with a repetitive impact hammer or flipper or other type of impact means as excitation source and accelerometers or other vibration measurement devices as vibration receivers. The frequency shift with the fill level is used as correlation model for estimating the level. The analysis of natural vibration modes of a real vessel is discussed below.

BRIEF DESCRIPTION OF THE FIGURES

FIG. 1 shows a schematic diagram of a level measurement system for a reactor vessel.

FIG. 2 shows a schematic drawing of the experimental setup for Example 1.

FIG. 3 shows a graph of the frequency spectrums at various water fill levels from Experiment 1 of Example 1, measured at CH2 and hammered at T1.

FIG. 4 shows a graph of the modal frequency versus water fill level from Experiment 1 of Example 1, measured at CH2 and hammered at T1.

FIG. 5 shows a graph of the modal vibration amplitude, normalized by hammer force, versus water fill level from Experiment 1 of Example 1, measured at CH2 and hammered at T1.

FIG. 6 shows a graph of the modal frequency versus fill level of the mixture of coke/water from Experiment 2 of Example 2, measured at CH2 and hammered at T1.

FIG. 7 shows the cantilever beam model of a vessel with liquid.

FIG. 8 shows the change in natural frequency of the fundamental mode of a cantilever beam as a function of the liquid level and mass.

DETAILED DESCRIPTION OF THE PREFERRED EMBODIMENTS

FIG. 1 shows a level measurement system for a reactor vessel such as a delayed coker drum. The system consists of an acoustic/vibration excitation source (1), one or several vibration receivers (2), temperature-reduction rod (3) for each receiver, a signal generator and amplifier (4), and a signal conditioning and acquisition unit (5), and data analysis and display unit (6). The acoustic/vibration source (1) could be one of vibration generators: electromagnetic dynamic shaker, piezoelectric actuators, pneumatic vibrators, or other devices that could be used to exert an impact force on the vessel wall periodically and generate a broad band of frequencies of the wall vibration. The location of the source is preferably near the top of the vessel above the maximum fill level. The selection of the frequency bandwidth of the source is determined by the experiments or/and numerical simulation of the vessel response so that the range of the frequency shift over the full fill cycle is completely covered and preferably in the audible ranges (1-20000 Hz). The vibration receivers (2) are preferably accelerometers that could measure the vibration in the frequency band of 1-20000 Hz and can withstand the operation temperature of the reactor vessel (typically 900 degree F. for a delayed coker). The temperature-reduction rods (3) may be used to reduce the high wall temperature to acceptable ones for low-temperature but low-cost vibration receivers, and preferably of about 6-18 inch in length and of 1-2 inch in diameter, and made of aluminum or other materials that could reduce the temperature while maintaining good vibration signal transmission. The attachment of the rod could be welded or bolted or mounted to the exterior surface of the vessel wall through a strong magnet. The locations of the receivers are preferably on the same line with the source parallel to the vertical axis of the vessel along which the fluid surface rises. For multiple receivers, the number of the receivers and space between adjacent receivers are determined by the requirement of the measurement resolution and range, and preferably in the order of several feet for a delayed coker. A signal generator and amplifier unit (4) is used for electromagnetic or piezoelectric shaker (1) to generate wall vibration. The signal conditioning and acquisition unit (5) is used to acquire the vibration signals from the receivers, and a data analysis and display unit (6) is used to analyze the signals for estimating the fill level and display/report the fill level to the operation personnel, and preferably computerized.

The following examples demonstrate the functionality of the above system to measure the fill level of a container.

Example 1

Experiment Set-Up

The experimental setup for a simulated delayed-coker consists of a SCUBA diving tank with an opening at the top (FIG. 2). The dimensions of the tank are 22 inches height and 7 inches ID. Three accelerometers CH2, CH3 and CH4 (Brüel & Kjær 4384) were positioned on the outer surface equidistant along the y-axis of the scuba tank (6, 12 and 18 inches from the bottom of tank respectively). Each accelerometer was coupled to a charge amplifier (Brüel & Kjær 2635) and the amplifiers connected to an analog-to-digital acquisition system controlled by Pulse 8.0 software (Brüel & Kjær) installed in a portable computer. An instrumented impact hammer (Brüel & Kjær 8202) was used to induce vibration of the tank. Two points of impact T1 (at the top of the tank) and T2 (at the middle of the tank) were chosen to determine the effect of different impact locations. The data was normalized to the impact force of the hammer. Normalized time-dependent data was converted to the frequency domain through Fourier Transform. The normalized frequency dependent data, or commonly called frequency response function, was averaged from ten impacts of the hammer at every fill level. The fill level of the scuba tank was measured with a ruler one-yard long. Two filling media were used for the experiments: 1—water and 2—a mixture of shot coke and water (coke/water).

Example 2

Water as Filling Media

FIG. 3 shows the frequency response functions of the wall vibration due to the hammer impact at various fill levels for the case of water filling up the scuba diving tank. As shown, multiple of vibration modes, identified as the peaks on the frequency response functions, are excited by the hammer impact. Each vibration mode is associated with two parameters: modal frequency and modal amplitude. Following a specific mode, a downward shift of the modal frequency with the water fill level is observed. FIG. 4 shows the correlation of the frequency of the first vibration mode with the fill level, measured with accelerometer at CH2 at hammer point of impact T1. In general, as the fill level increases, the modal frequency decreases. The change in the modal frequency with the fill level show that vibration data can be used to measure the fill level of similar systems.

A comparison between different accelerometer positions as well as impact points was also performed in order to determine optimum system configuration. Table 1 shows a reproducible pattern in the modal frequency shift for different accelerometers used (CH2, CH3, and CH4) at both impact points (T1 and T2). In general, the measurements of CH2, CH3 and CH4 give very similar relationships between the modal frequency and the fill level, if not identical. In term of the effect of the impact location, T1 and T2 also produce the similar results. However, the data shows that the combination of T2 and CH2 gives slightly better measurements range of the fill level than other combinations. Considering that a delayed coker drum is substantially larger than the SCUBA diving tank used in the experiment, use of impact point near the top of the drum and vibration measurement point near the bottom of the drum is expected to give the better measurement of the fill level.

TABLE 1

| Water Fill Level | Modal Frequency LAB TANK | | | | | |
|---|---|---|---|---|---|---|
| | T1 | | | T2 | | |
| (Inches) | CH2 | CH3 | CH4 | CH2 | CH3 | CH4 |
| 0 | 1168 | 1168 | 1168 | 1168 | 1168 | 1168 |
| 2.6 | 1168 | 1168 | 1168 | 1168 | 1168 | 1168 |
| 4.4 | 1165 | 1168 | 1168 | 1168 | 1168 | 1168 |
| 6.2 | 1136 | 1136 | 1136 | 1136 | 1136 | 1136 |
| 8.0 | 1088 | 1088 | 1088 | 1088 | 1088 | 1088 |
| 10.0 | 1030 | 1030 | 1031 | 1032 | 1030 | 1030 |
| 11.8 | 992 | 992 | 992 | 992 | 992 | 990 |
| 13.0 | 960 | 960 | 960 | 960 | 960 | 960 |
| 15.4 | 930 | 933 | 934 | 936 | 935 | 935 |
| 17.2 | 915 | 925 | 922 | 920 | 925 | 925 |
| 18.6 | 912 | 912 | 912 | 912 | 912 | 912 |
| 20.4 | 905 | 912 | 910 | 912 | 912 | 912 |

Though FIG. 4 shows good correlation of the modal frequency with the fill level, it also shows the limitation of the measurement range when the fill level is very low. In the case of water filling, the frequency downward shift is very small below the fill level of 5 inches from the bottom of the tank. This limitation could be overcome when the amplitude of the vibration mode is also considered and fused with the modal frequency data. FIG. 5 shows the normalized vibration amplitude of the first mode verse the fill level. Though the amplitude data is nosier than the frequency data, it shows an inverse correlation with the fill level, and it is particularly more sensitive in the low fill levels. Therefore the combination of the modal vibration amplitude and frequency will improve the measurement of the fill level.

Example 3

Shot Coke Saturated Solution as Filling Media

For the case of the mixture of coke with water, FIG. 6 shows plots of the modal frequency versus the fill level measured with CH2 at hammer point of impact T1. Again the same behavior as for the case of water-only is observed, i.e. the shift to lower modal frequencies with fill level. This trend is not only observed for this particular mode but also for other modes with the modal frequencies throughout the range of 1 to 12,000 Hz.

In general, both experiments (water-only and coke/water) show similar correlations. However, there are a few disparities between the experiments. For example, the frequency shift observed for the water-only case occurs within a range of about 260 Hz. On the other hand, for the case of coke plus water the frequency shift occurs within a range of about 410 Hz. This difference is expected due to the differences in the chemical composition of the filling media. For example, water is less dense than a saturated mixture of coke and water and frequency attenuation is more apparent. Notice also that the more dramatic the differences observed for a particular system the easier it will be to accurately correlate these measurements with the fill level.

The analysis of the natural vibration modes of a realistic vessel such as delayed coker is very complex and usually requires numerical computation. To illustrate the effect of the liquid level on the natural frequency of a vessel, we use a simplified mathematic model. At low frequency limit, a long and slender vessel could be represented as a beam with inhomogeneous mass distribution, as shown in FIG. 7.

The governing equation for the transverse vibration based on the beam model is given by $$K_1 \frac{\partial^4 y}{\partial x^4} + M_1 \frac{\partial^2 y}{\partial t^2} = 0 \quad (1)$$
$$\text{for } 0 \leq x \leq h$$

$$K_2 \frac{\partial^4 y}{\partial x^4} + M_2 \frac{\partial^2 y}{\partial t^2} = 0 \quad (2)$$
$$\text{for } h \leq x \leq l$$

Where $K_1$ and $M_1$ are the stiffness and mass parameters of the beam below the liquid level, and $K_2$ and $M_2$ stiffness and mass above the liquid level. Given boundary conditions, equations (1) and (2) can be solved to determine the natural frequencies and mode shapes. Here, we will use Rayleigh's method to approximate the natural frequency of the fundamental mode. Let us consider a reasonable shape function of the fundamental mode with boundary conditions of being "fixed" at the x=0, and "free" at the x=1 (cantilever beam):

$$Y_1(x) = Y_0 \left(1 - \cos\left(\frac{\pi x}{2l}\right)\right) \quad (3)$$

The maximum potential energy of the beam vibration of the mode is given by $$Pot = \frac{1}{2} \int_0^l K(x) \left(\frac{\partial^2 Y_1}{\partial x^2}\right)^2 dx \quad (4)$$
$$= \frac{1}{2} K_1 \int_0^h \left(\frac{\partial^2 Y_1}{\partial x^2}\right)^2 dx + \frac{1}{2} K_2 \int_h^l \left(\frac{\partial^2 Y_1}{\partial x^2}\right)^2 dx$$

And the maximum kinetic energy is $$Kin = \frac{1}{2} \int_0^l M(x) \omega_1^2 Y_1^2 dx \quad (5)$$
$$= \frac{1}{2} \omega_1^2 M_1 \int_0^h Y_1^2 dx + \frac{1}{2} \omega_1^2 M_2 \int_h^l Y_1^2 dx$$

Where $\omega_1$ is the natural frequency of the mode. Based on Rayleigh's method, the natural frequency can be estimated by equating $$Pot = Kin \quad (6)$$

Which gives $$\omega_1^2 = \left(\frac{\pi}{2l}\right)^4 \frac{(K_1 - K_2)\left(\frac{h}{2} + \frac{l}{2}\sin\left(\frac{\pi h}{l}\right)\right) + K_2 \frac{l}{2}}{(M_1 - M_2)\left(\frac{3h}{2} + \frac{l}{2\pi}\sin\left(\frac{\pi h}{l}\right) - \frac{4l}{\pi}\sin\left(\frac{\pi h}{2l}\right)\right) + M_2 \frac{l(3\pi - 8)}{2\pi}} \quad (7)$$

Let us consider the case where the stiffness of the beam is dominated by the vessel wall, K, so that $$K_1 \approx K_2 = K \quad (8)$$

and vapor mass above the liquid is neglected $$M_1 \approx M + \delta M_{liquid}$$
$$M_2 \approx M \quad (9)$$

Where M is the mass of the vessel wall, and $\delta M_{liquid}$ is mass loading of the liquid per unit length of the vessel.

$$\omega_1^2 = \left(\frac{\pi}{2l}\right)^4 \frac{K}{M} \frac{1}{\frac{\delta M_{liquid}}{M}\left(\frac{3h}{l} + \frac{1}{\pi}\sin\left(\frac{\pi h}{l}\right) - \frac{8}{\pi}\sin\left(\frac{\pi h}{2l}\right)\right) + \frac{3\pi - 8}{\pi}} \quad (10)$$

Or $$\frac{\omega_1}{\omega_0} = \frac{1}{\sqrt{\frac{\pi}{3\pi - 8} \frac{\delta M_{liquid}}{M}\left(\frac{3h}{l} + \frac{1}{\pi}\sin\left(\frac{\pi h}{l}\right) - \frac{8}{\pi}\sin\left(\frac{\pi h}{2l}\right)\right) + 1}} \quad (11)$$

Where $$\omega_0 = \left(\frac{\pi}{2l}\right)^2 \sqrt{\frac{\pi}{3\pi - 8}} \sqrt{\frac{K}{M}} \quad (12)$$

is the approximated natural frequency of the first mode of a cantilever beam when there is no liquid in the vessel. It should be noted that equation (12) is very close to the exact solution of the cantilever beam.

FIG. 8 shows the change in natural frequency as a function of the liquid level and mass. Given a value of $\delta M_{liquid}/M$, the frequency decreases with the level, h. Given a value of h/l, the frequency drop is larger with heavier liquid or large value of $\delta M_{liquid}/M$. These numerical results are consistent with experimental results, as discussed in previous sections and shown in FIGS. 4 and 6.

What is claimed is:

1. A method to determine the fill level of material inside a reactor vessel that includes liquid and solid comprising relating a shift of the natural frequencies of wall vibrations to fill level wherein a relationship between frequency shift of wall vibrations and fill level is determined by
   a) inducing vibration on the wall of said reactor vessel from an external source,
   b) measuring the vibration signals of said reactor vessel wall as a function of frequency and modal vibration amplitude of said reactor vessel wall, and
   c) relating the combination of the frequency and the modal vibration amplitude of said reactor wall to the fill level of said liquid and solid;
   wherein the method utilizes a system consisting of:
      an acoustic/vibration excitation source,
      one or more vibration receivers,
      a temperature reduction rod for each receiver,
      a signal conditioning and acquisition unit, and
      a data analysis and display unit, and
   wherein the relating of the combination of the frequency and the modal vibration amplitude of said reactor wall to the fill level is independent of a location of the one or more vibration receivers on said reactor wall.

2. The method of claim 1 wherein said wall vibration from the external source is generated with a broad band of frequencies in said vessel.

3. The method of claim 2 wherein the frequencies in the said vessel is determined from the vibration signals measured on the exterior wall when the vessel contains different levels of material.

4. The method of claim 1 wherein said external source is a dynamic actuator.

5. The method of claim 4 wherein said dynamic actuator is a periodic pneumatic impactor, an electromatic dynamic shaker, or a piezoelectric dynamic actuator.

6. The method of claim 4 wherein said external source is mounted on the exterior surface of the wall of the vessel and located so as to produce an optimal vibration signal.

7. The method of claim 1 wherein said frequency range is 1-20,000 Hz.

8. The method of claim 1 wherein said fill level is related to the frequency of a preselected vibration mode.

9. The method of claim 8 wherein the vibration mode is the first vibration mode and associated frequency is the first dominant peak in the frequency spectrum.

10. The method of claim 1 further comprising an analytical model to relate to frequency of the vibration signals to the fill level.

11. The method of claim 1 wherein the step of measuring the vibration signals by accelerometers placed at positions on the exterior of the vessel will give optimum results.

12. The method of claim 1 wherein the reactor vessel is a delayed coker drum.

13. A method to determine the fill level of material inside a reactor vessel that includes liquid and solid comprising relating attenuation of wall vibrations to fill level wherein a relationship between the attenuation of wall vibrations and fill level is determined by
   a) inducing vibration on the wall of said reactor vessel from an external source, the external source being located at a height above a maximum fill level for said reactor vessel,
   b) measuring the vibration signals of said reactor vessel wall on the exterior wall of said reactor vessel as a function of frequency,
   c) selecting a vibration mode, and
   d) relating the modal vibration amplitude of the measured vibration signals of said reactor vessel wall to the fill level of said liquid and solid,
   wherein the relation between the frequency shift and fill level, and the relation between the modal vibration amplitude and fill level are combined to determine fill level.

14. The method of claim 13 wherein the method utilizes a system consisting of:
   an acoustic/vibration excitation source,
   one or more vibration receivers,
   a temperature reduction rod for each receiver,
   a signal conditioning and acquisition unit, and
   a data analysis and display unit.

15. The method of claim 14, wherein the one or more vibration sensors are located on a line with the acoustic/vibration excitation source that is parallel to a vertical axis of the vessel along which the fluid surface rises.

16. The method of claim 13 wherein the reactor vessel is a delayed coker drum.

* * * * *